Aug. 17, 1965    B. A. HIGGINS    3,200,940
BELT CONVEYORS
Filed Feb. 4, 1964
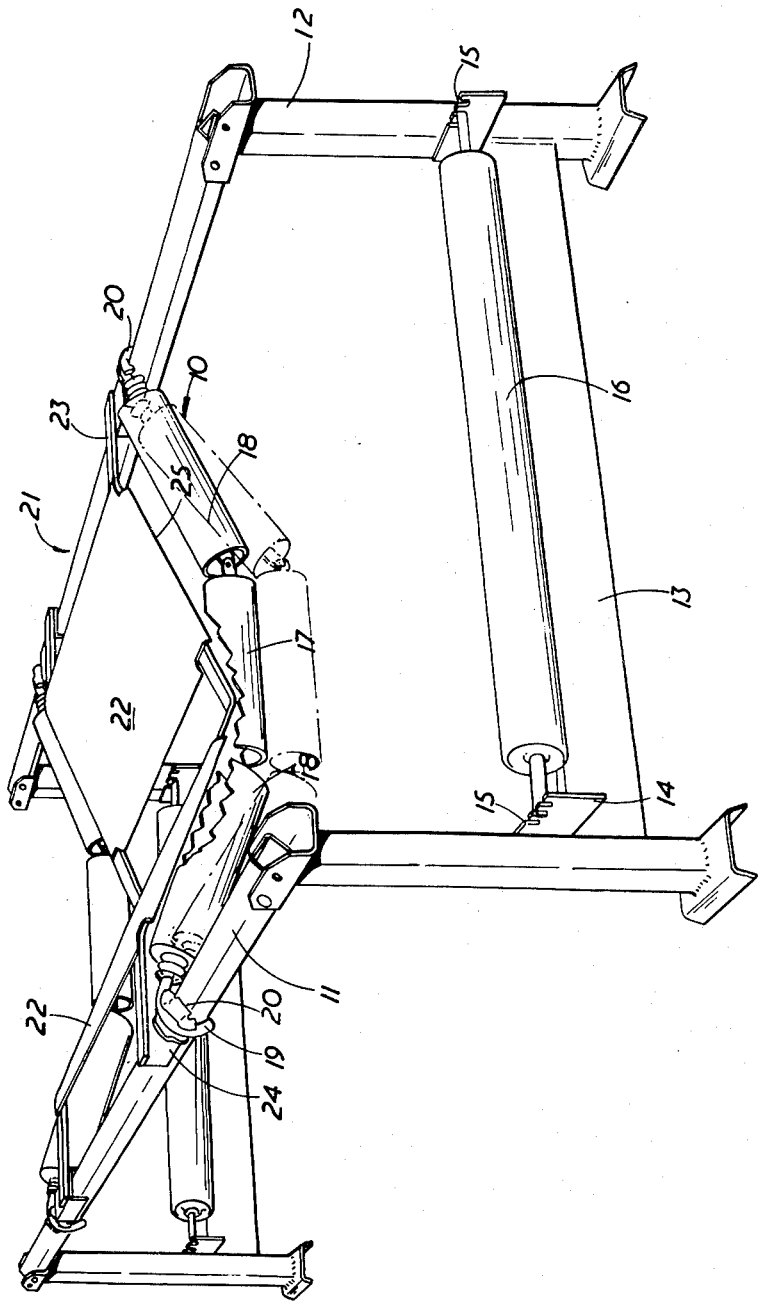
Bernard Arthur Higgins
BY Scrivener Parker Scrivener & Clarke

United States Patent Office 3,200,940
Patented Aug. 17, 1965

3,200,940
BELT CONVEYORS
Bernard Arthur Higgins, Storridge, near Malvern, England, assignor to The Mining Engineering Company Limited, Worcestershire, England, a British company
Filed Feb. 4, 1964, Ser. No. 342,474
Claims priority, application Great Britain, Feb. 16, 1963, 6,377/63
4 Claims. (Cl. 198—192)

This invention relates to improvements in belt conveyors such as are used for conveying coal and other minerals in mines, quarries, and other workings.

When the loaded run of a conveyor belt is travelling downhill at a substantial angle and is loaded with coal or other relatively heavy material, the belt and its load have considerable gravitational energy and one of the problems encountered is to provide effective means for braking or retarding the movement of the belt under gravity.

Our invention is particularly concerned with the solution of this problem in a belt conveyor of the kind in which the loaded run of the belt is supported by self-troughing idlers which allow the troughing angle of the belt to increase automatically in accordance with the load. A conveyor incorporating self-troughing idlers of that kind is described in the specification of our British Patent No. 872,266. Each idler comprises an assembly of three rollers rotatably mounted on individual spindles of which the adjacent ends are hingedly connected to each other, the central roller being horizontal and the side rollers being oppositely inclined, and the spindles of the side rollers being connected to supports at each side of the conveyor by yielding means which allow the troughing angle to increase with load.

The present invention consists in a conveyor with self-troughing roller assemblies and one or more trays with oppositely inclined belt-retarding surfaces which are so positioned that when the belt is unloaded it is supported by the roller assemblies clear of the tray, but when the belt is loaded and the troughing angle of the roller assemblies increases the underside of the belt comes into contact with the tray or trays which act as a frictional brake or retarder, each tray being situated between adjacent roller assemblies.

The advantage of the invention appear in the following description, in which an embodiment of the invention is described with reference to the accompanying drawing which shows a perspective view of part of a self-troughing conveyor.

The self-troughing roller assemblies 10 which support the load-carrying run of the belt (not shown) are suspended at intervals between two parallel, tubular stringers 11. These stringers are mounted on stanchions 12 which are arranged in pairs connected by a cross-bar 13. The stanchions carry brackets 14 provided with notches 15 which receive the spindle of one of the long rollers 16 which support the return run of the belt.

The roller assemblies consist of a horizontal central roller 17 and two oppositely inclined side rollers 18, each of these rollers being mounted on a rigid spindle which is hingedly connected to its neighbour. The spindles of the side rollers are telescopic and relative movement between the two parts of the telescopic spindle in the direction of elongation is resisted by a spring housed within the associated side roller. The outer ends of the side spindles are formed as hooks 19 which rest in the grooves of locating members 20 fastened to the stringers.

A tray 21 is mounted on the stringers between the two roller assemblies. This tray consists of two oppositely inclined plates 22 welded to two parallel bars 23 each of which is bent at the centre to form a shallow V.

The outer ends of the bars are welded to U-shaped members 24 which embrace the stringers. The height and inclination of the plates 22 are such that when the belt is unloaded it is supported by the rollers just clear of the trays, but when the belt is loaded the troughing angle of the roller assemblies increases (as shown in chain dotted lines) and the underside of the belt comes into contact with the tray which acts as a frictional brake or retarder.

The end edges 25 of the plates, which are at right angles to the line of travel of the belt, extend beyond the bars and are cranked or curved downwardly to provide a lead for the belt.

The tray is simply dropped into position between two adjacent roller assemblies and any desired number of trays can be fitted to a downhill stretch of conveyor according to requirements. In particular, the number of trays fitted can be selected according to the downhill inclination of the conveyor to provide a retarding effect such that the gravitational energy of the belt and its load is reduced to a value only sufficient to overcome the frictional resistance of the rollers and to move the return run of the belt up hill.

The trays can be fitted to standard conveyor structure without modification of the conveyor. Moreover, as the belt when empty or only lightly loaded is supported clear of the tray or trays, it operates with a minimum of friction.

The invention can of course be applied equally well to conveyors in which the stringers are of channel section and the roller assemblies are cradle mounted, and to conveyors having any other type of structure permitting the mounting of the trays between self-troughing roller assemblies of which the troughing angle increases with load.

What I claim is:

1. A belt conveyor incorporating a belt, and resiliently mounted self-troughing idler roller assemblies supporting the belt and movable between a first level when the belt is unloaded and another level when the belt is loaded, in combination therewith, at least one belt supporting tray mounted between adjacent roller assemblies at a level below said first level of the rollers, and in a position to be frictionally engaged by the underside of said belt when the latter is loaded whereby said tray acts as a friction brake.

2. A belt conveyor as claimed in claim 1, wherein end edges of the tray are bent downwardly to provide a lead for the belt.

3. A belt conveyor incorporating a belt, a framework, and self-troughing idler roller assemblies resiliently mounted on said framework and supporting the belt, said idler roller assemblies being movable between a first level when the belt is unloaded and another level when the belt is loaded, in combination therewith, at least one belt supporting tray mounted between adjacent roller assemblies at a level below said first level of the rollers, said tray comprising oppositely inclined plates secured to bars which are bent to form a shallow V, and means provided on said bars for engaging said framework, said tray being positioned to be frictionally engaged by the underside of said belt when the latter is loaded whereby said tray acts as a friction brake.

4. A belt conveyor having a downhill inclination incorporating a belt, a framework, and self-troughing idler roller assemblies resiliently mounted on said framework and supporting the belt, said idler roller assemblies being movable between a first level when the belt is unloaded and another level when the belt is loaded, in combination therewith a plurality of belt supporting trays of which each tray is mounted between adjacent roller assemblies and comprises oppositely inclined plates secured to bars which are bent to form a narrow V, and means provided on said bar for engaging said framework, whereby when the belt is loaded the underside of the belt comes into contact with the plates which act as a friction retarder, the number of trays being selected to provide a retarding effect consistent with the downhill inclination of the conveyor whereby the gravitational energy of the belt and the load on the belt is reduced to a value only sufficient to overcome the friction resistance of the roller assemblies and to move the return run of the belt uphill.

References Cited by the Examiner
UNITED STATES PATENTS 3,047,131  7/62  Duncan _____ 198—192

SAMUEL F. COLEMAN, *Primary Examiner.*
EDWARD A. SROKA, *Examiner.*